United States Patent
Downs

[11] 3,945,302
[45] Mar. 23, 1976

[54] DIAPHRAGM ADJUSTMENT TOOL
[75] Inventor: Ronald Downs, Seymour, Ind.
[73] Assignee: Cummins Engine Company, Inc., Columbus, Ind.
[22] Filed: Apr. 9, 1975
[21] Appl. No.: 566,292

[52] U.S. Cl. .................. 92/13.2; 92/13.41; 92/13.7; 251/61.2; 251/61.4
[51] Int. Cl.² F01B 19/00; F01B 31/14; F15B 15/24
[58] Field of Search ....... 92/13.2, 13.4, 13.41, 13.5, 92/13.7, 13.8, 128; 251/61.2, 61.4; 137/315

[56] References Cited
UNITED STATES PATENTS

| | | | |
|---|---|---|---|
| 28,090 | 5/1860 | Lindsay | 92/13.8 |
| 3,086,745 | 4/1963 | Natho | 251/62 |
| 3,446,241 | 5/1969 | Skoli | 251/61.4 X |
| 3,884,446 | 5/1975 | Erickson | 251/61.4 |
| 3,896,843 | 7/1975 | Millar | 251/61.4 |

FOREIGN PATENTS OR APPLICATIONS

| 1,803,166 | 9/1969 | Germany | 251/61.4 |
|---|---|---|---|

*Primary Examiner*—Martin P. Schwadron
*Assistant Examiner*—Abraham Hershkovitz
*Attorney, Agent, or Firm*—Gary M. Gron; Robert T. Ruff

[57] ABSTRACT

The disclosure illustrates a tool which permits the adjustment of a pressure responsive flow controlling diaphragm assembly while the diaphragm is pressurized. The tool is used to adjust the position of a central shaft threaded through the diaphragm and held in place by a locking jam nut. The central shaft and locking nut are received in a center bolt having a hexagonal head which holds the diaphragm assembly together. The tool comprises a base that is mounted over the pressurized face of the diaphragm in place of its normal cover. A series of concentric sockets extend through the base for engaging the center bolt and the lock nut. A center shaft extends through the sockets and has a section of an allen wrench received in a corresponding recess of the central shaft of the diaphragm assembly. Suitable passages in the base enable the diaphragm to be pressurized to a desired adjustment pressure. Manipulation of the various sockets and center shaft permits the central diaphragm shaft to be adjusted upon actual operating conditions.

10 Claims, 4 Drawing Figures

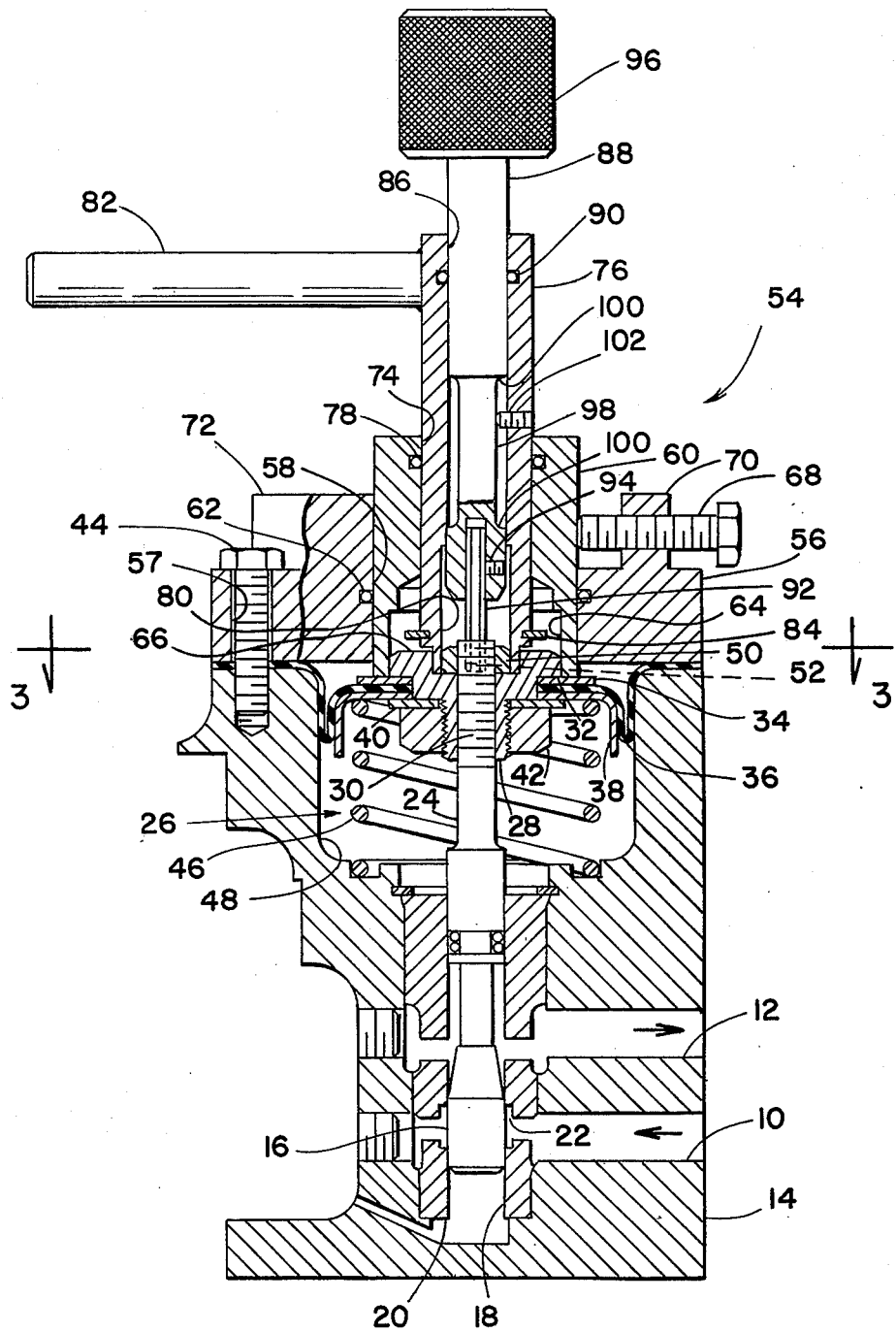

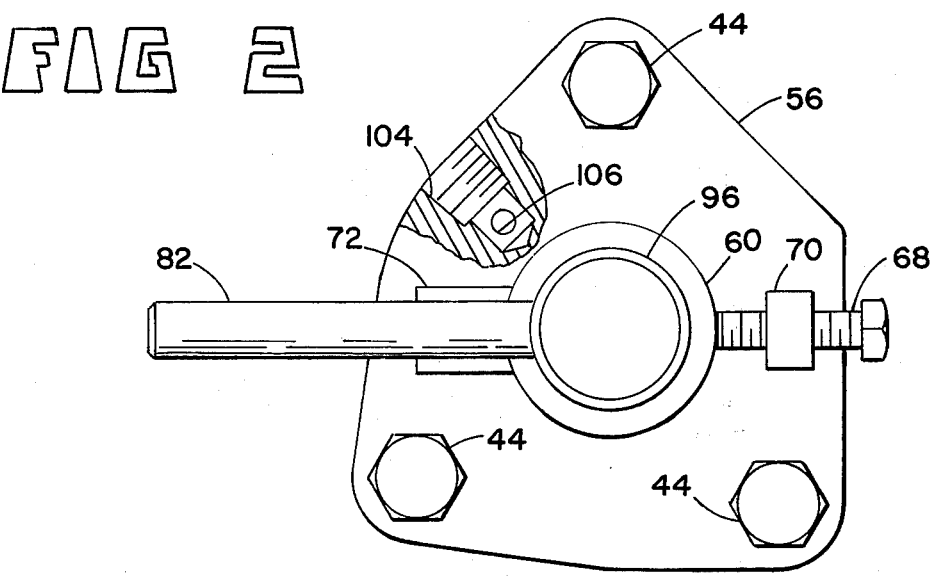
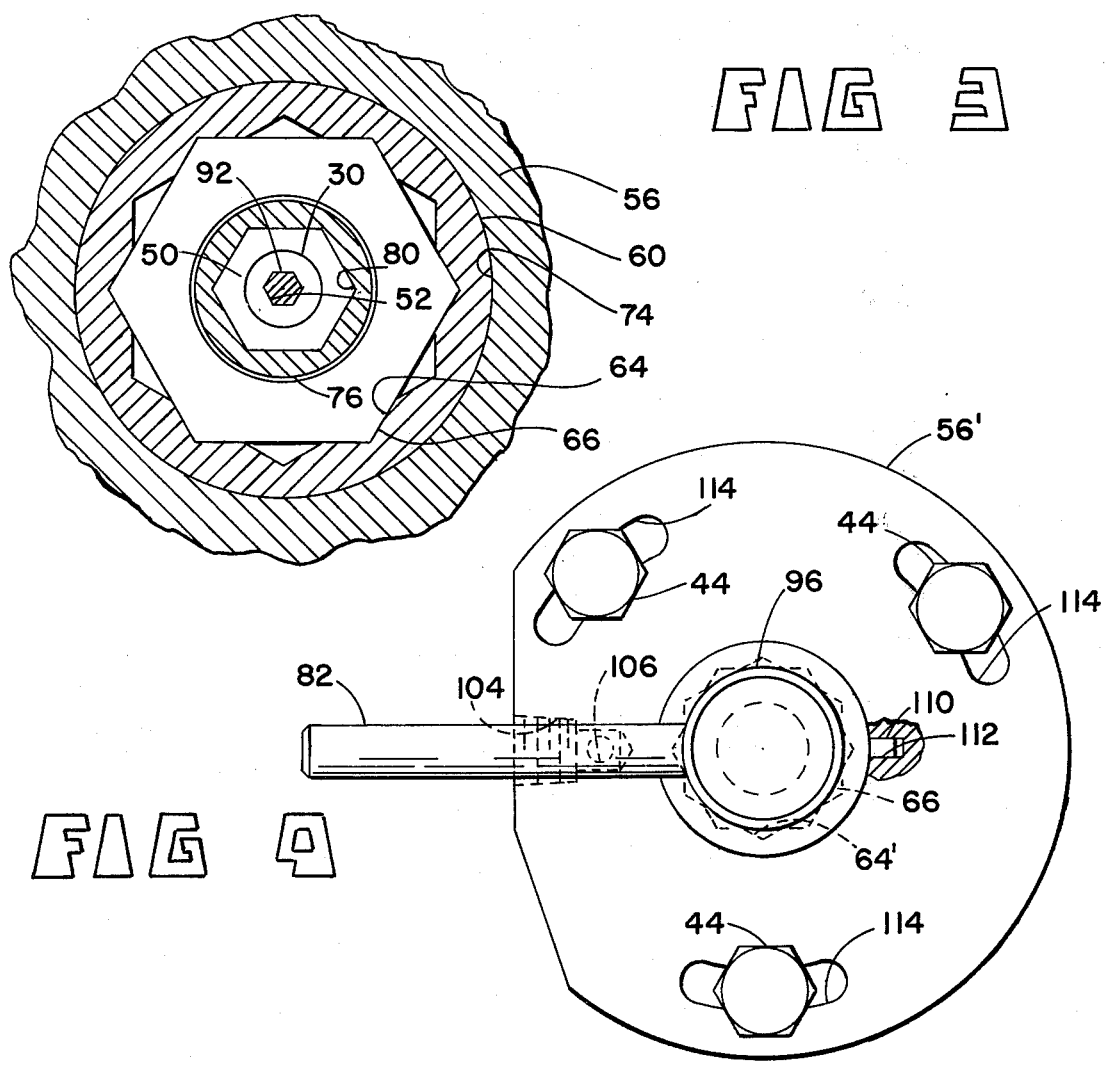

DIAPHRAGM ADJUSTMENT TOOL

The present invention relates to adjustment tools and more particularly to tools which are used to adjust relative positions of elements on pressure responsive diaphragm assemblies.

The diaphragm assembly has proved to be an extremely effective device for translating a fluid pressure input to a mechanical displacement output. A typical arrangement of such a device consists of a flexible disc extending across a recess in a housing and a center section movable with respect to the sides of the recess. The center section supports a central shaft providing a displacement output. One side of the flexible diaphragm may be spring loaded and the other exposed to a source of pressure providing a pressure input.

The linear displacement of the central shaft therefore is a predetermined function of the level of pressure applied to the diaphragm. Since it is a control device, the position of the central shaft relative to the diaphragm assembly must be maintained within precise limits to achieve a proper and predictable function.

In the past, adjustments of diaphgragms were performed using a number of different approaches. One approach is to physically adjust the position of the central shaft relative to the diaphragm assembly by taking the cover off of the diaphragm. The other involves placing shims in the connections between the spring and the diaphragm to vary the position of the entire assembly relative to its housing.

The problem with both of the above approaches is that they require adjustments under non-pressure conditions. Variations in spring characteristics can effect the accuracy of such an adjustment since it is not performed under actual operating conditions.

These problems are solved by an adjustment tool for a diaphragm assembly of the above general type. The tool comprises a base plate that is secured over a recess containing a diaphragm assembly so that it may be pressurized. A first element is telescoped through the base and a second element is telescoped through the first element. The first element connects with a locking means to permit it to be selectively engaged and disengaged. The second element connects with the central shaft of the diaphragm assembly permitting its position to be adjusted. The elements are sealed with respect to one another and the housing to permit adjusting of the central shaft when the diaphragm is pressurized.

The above and other related features of the present invention will be apparent from a reading of the following description of the disclosure shown in the accompanied drawings, and the novelty thereof pointed out in the appended claims:

In the drawings:

FIG. 1 is a longitudinal section view of a diaphragm adjusting tool embodying the present invention, along with a diaphragm assembly with which it is used.

FIG. 2 is a plan view of the adjusting tool of FIG. 1; and

FIG. 3 is a greatly enlarged cross sectional view of the adjusting tool of FIG. 1 taken on lines 3—3 of FIG. 1.

FIG. 4 is a plan view of a diaphragm adjusting tool showing a different embodiment of the present invention.

FIG. 1 illustrates a diaphragm assembly with which the present invention may be used. The diaphragm assembly is used to control the flow of fluid between an inlet 10 and outlet 12 of a housing 14. A plunger 16 is displaceable in a bore 18 in a valve sleeve 20, mounted in housing 14. Plunger 16 is displaceable to uncover a metering groove 22 connected with inlet port 10. Plunger element 16 is integral with a central shaft 24 extending out of valve sleeve 20 and to a diaphragm assembly generally indicated at 26.

Diaphragm assembly 26 comprises a center bolt 28 threaded onto threads 30 at one end of central shaft 24. Bolt 28 has a shoulder 32 which receives a washer 34. A flexible circular diaphragm 36 is sandwiched between washer 34 and a cup 38 by a washer 40, and nut 42 threaded onto center bolt 28. The periphery of the flexible diaphragm 36 is mounted to housing 14 having a cover plate (not shown) and suitable mounting screws 44. A spring 46 abuts the bottom wall of a recess 48 in housing 14 to urge the center bolt 28 and connected elements in a direction out of the recess, thus restricting flow into housing 14 by way of inlet 10.

Fluid pressure applied to the outer face of the flexible diaphragm 36 acts against the spring force to produce a flow area at metering groove 22 which is some predetermined function of the pressure level. The position of central shaft 24 relative to the central bolt 28 is varied by rotating the central shaft through a hexagonal recess 52. The threaded interconnection causes the shaft to be displaced longitudinally to a desired position. A locking jam nut 50 is threaded over the section 30 on central shaft 24. Nut 50 may be loosened to permit adjustment of central shaft 24 or may be tightened to lock it into place.

To permit the center shaft to be adjusted in accordance with the present invention, an adjusting tool generally indicated at 54 is provided. As shown in FIGS. 1, 2, and 3 the adjusting tool 54, comprises a base 56 that is secured over the outer face of the diaphragm 36 by the screws 44 extending through holes 57. The lower face of base 56 is sufficiently smooth so that the periphery of the flexible diaphragm 36 is sealed. Base 56 has a circular opening 58 generally in line with the center sections of the diaphragm assembly 26. A generally cylindrical socket 60 is received in opening 58 and sealed with respect to it by a suitable "O" ring 62. Socket 60 has at least a hexagonal recess 64 and preferably a twelve point recess permitting the socket 60 to be received over a hexagonal head 66 on center bolt 28 to restrain its rotation. Socket 60 is rotatable with respect to base 56 but is locked in place by a screw 68 threaded through a nut 70 on base 56 and urging socket 60 toward a brace 72.

Socket 60 has a circular through opening 74 which receives an elongated cylindrical socket 76. An "O" ring 78 seals socket 76 with respect to socket 60. The lower end of socket 76 has a suitable recess 80 adapted to fit over locking jam nut 50 and permit torque to be applied to tighten or loosen it. A handle 82 at the upper end of socket 76 permits the application of torque by an operator to the locking jam nut 50. A snap ring 84 is positioned about the lower end of socket 76 to limit its movement in an axial direction away from housing 14.

Socket 76 has a circular through bore 86 which receives a central shaft 88. An "O" ring 90 provides a sealed connection between the two elements. The lower end of shaft 88 mounts a section of a hexagonal allen wrench 92 by means of a set screw 94. A wrench 92 is adapted to be received in socket 52 in the end of central shaft 24. Knob 96 on the upper end of shaft 88 permits shaft 24 to be rotated and thus vary its linear position with respect to the center bolt 28. Shaft 88 has a annular recess 98 bounded by shoulders 100 which abut a set screw 102 projecting inward from socket 76 to limit the displacement of shaft 88.

To adjust central shaft 24 the base 56 is placed over housing 14 of the normal cover. The screw 68 is loosened to permit relative rotation of socket 60 in base 56. Socket 60 is rotated until its recess 64 matches up with the hexagonal head 66 of center bolt 28. It is pushed over the head 66 and the screw 68 tightened to hold it in place. Base 56 is secured in place and a source of fluid pressure is applied to the outer face of diaphragm 36 via a fitting inlet 104 and port 106 in base 56 (see FIG. 2.). The pressure will displace the center section of the diaphragm assembly 26 a given amount against spring 46. The desired linear displacement of shaft 24 is measured either directly, or indirectly, by determining pressure flow characteristics reflected through outlet port 12. In other words, if the pressure in inlet port 10 is known, the outlet pressure 12 gives a value that is some function of the flow area at the metering groove 22. If the metering area is not at the required level, shaft 24 is adjustably positioned with respect to center bolt 28 by first loosening locking jam nut 50 and then turning knob 96. When the correct position is achieved, handle 82 is manipulated to tighten the locking jam nut and fix the proper position of shaft 24. In the application illustrated, the position of central shaft 24 is adjusted at an intermediate pressure level during which the deflection of the diaphragm assembly away from base 56 is not great enough to prevent engagement of sockets 60, 76, and central shaft 86 with the corresponding diaphragm elements. There is sufficient axial movement in these elements to permit intermediate deflections of the diaphragm assembly. If even greater deflections during adjustment are desired, it is simply necessary to lengthen socket 60 and if necessary the sockets 76 and central shaft 86.

FIG. 4 illustrates an alternate embodiment of the present invention showing a different arrangement for positioning socket 60 with respect to the head 66 of center bolt 28. A modified socket 60' is received in a base 56' through a circular bore 58' suitably sealed. However, socket 60' is restrained from rotating relative to base 56 by a pin 110 extending from socket 60' and received in a notch 112 of base 56'. A plurality of arcuate slots 114 are provided in base 56' and receive mounting screws 44. Slots 114 permit limited rotation of the base 56' with respect to housing 14. Socket 60' has a 12 point socket recess 64' adapted to be placed over hexagonal head 66 of center bolt 28. The length of the slots 114 is made long enough to permit rotational movement at least as great as the relative rotational movement required to index socket recess 64' and head 66 between adjacent positions. In practice it has been found that arcs of approximately 30° give sufficient freedom of rotational movement so that any given position of the center bolt 28 can be accomodated.

Thus we see that the tools described above permit correct adjustment of a diaphragm under dynamic operating conditions during which the diaphragm is pressurized. This permits extremely accurate and rapid adjustments of the diaphragm assembly. While the tools above have been described in connection with particular socket and head arrangements it should be apparent that other types may be employed within the scope of this invention.

Having thus described the invention what is claimed as novel and desired to be secured by letters patent of the United States is:

1. Apparatus for adjusting the relative position of a central shaft of a pressure responsive diaphragm assembly positioned in a recess in a housing, said diaphragm assembly including locking means for selectively engaging and disengaging said central shaft with said diaphragm assembly, said apparatus comprising:
   a base plate releasably and sealingly secured to said housing over said recess, said base plate having means defining an opening therethrough generally in line with said central shaft and locking means;
   a first element telescoped through and sealingly engaging said opening, said first element being connectable with said locking means and displaceable relative to said base plate for selectively engaging and disengaging said locking means, said first element having an opening therethrough,
   a second element telescoped through and sealingly engaging the opening through said first element, said second element including means for interconnecting said second element with said central shaft and displaceable relative to said base plate for varying the position of said central shaft relative to said diaphragm assembly when said locking means is disengaged;
   said base plate including means for connecting a source of pressurized fluid to said recess whereby the position of said central shaft is adjustable under conditions in which said diaphragm is exposed to pressure.

2. Apparatus as in claim 1 wherein said central shaft threadedly engages said diaphragm assembly and wherein:
   the opening through said first element is a circular opening; and,
   said second element has a cylindrical outer surface sealingly engaging the opening through said first element whereby said second element may be rotated with respect to said base plate thereby permitting the adjustment of said central shaft relative to said diaphragm assembly.

3. Apparatus as in claim 2 wherein said locking means comprises an element coaxial with and threaded over said central shaft and rotatable to abut said diaphragm assembly thereby locking said central shaft, and wherein:
   the opening defining means on said base plate defines a circular opening;
   said first element has a cylindrical outer surface sealingly engaging said opening defining means thereby permitting said first element to be rotated relative to said base plate, said first element having means permitting an interconnection between said first element and said locking means to permit the application of torque thereto;
   whereby said first element may be rotated to selectively engage and disengage said locking means.

4. Apparatus as in claim 1 wherein said diaphragm assembly has a rigid center section receiving said central shaft and locking means and an outwardly extending flexible and resilient section secured about the recess in said housing and wherein said opening defining means further comprises means extending from said opening defining means and interconnectable with the rigid center section of said diaphragm assembly for restraining the movement thereof during adjustment of said central shaft.

5. Apparatus as in claim 4 wherein said central shaft is rotated relative to said center section to adjust its position relative thereto and said locking means is rotated to selectively engage and disengage the locking means and wherein said restraining means comprises a means engageable with said center section to prevent rotation relative to said base plate.

6. Apparatus as in claim 5 wherein said restraining means comprises:
   a third element engageable with said center section to prevent rotation thereof, said third element having a circular opening through which said first element is telescoped, said first element sealingly engaging said third element, said third element having a cylindrical outer surface sealingly received in a circular opening through said base plate;
   and means fixed on said base plate for selectively clamping said third element with respect to said base plate.

7. Apparatus as in claim 6 wherein the center section of said diaphragm has a hexagonal head and said third element has a recess receiving said head and restraining rotation thereof.

8. Apparatus as in claim 5 wherein said restraining means comprises:
   means non-rotatably secured to said base plate and having a central opening through which said first element is telescoped, said restraining means having a recess therein in which said center section of said diaphragm is received to prevent rotation thereof;
   said center section of said diaphragm and said restraining means having interengaging configurations with respect to one another permitting interengagement in one of a plurality of indexed positions,
   said base plate being releasably secured to said housing by a plurality of elements extending through said base plate, said base plate having arcuate slots through which said securing means extends permitting rotation of said base plate,
   said slots extending through an arc at least as great as the relative arc between said center section and said restraining means from one indexed position to the next;
   whereby said restraining means prevents rotation of said center section of said diaphragm in any one of a plurality of initial positions.

9. Apparatus as in claim 1 further comprises means for preventing withdrawal of said first and second elements from said base plate whereby said elements will be restrained from displacement out of said base plate when said recess is pressurized.

10. Apparatus as in claim 9 wherein said withdrawal prevention means comprises:
   a snap ring secured over said first element adjacent the end thereof connectable with said locking means, said snap ring extending beyond the opening defined in said opening defining means; and,
   a protrusion extending inward from the opening through said first element, said second element having a recess bounded at either end by shoulders which abut said protrusion for limiting the movement of said second element with respect to said first element.

* * * * *